Patented Mar. 1, 1927.

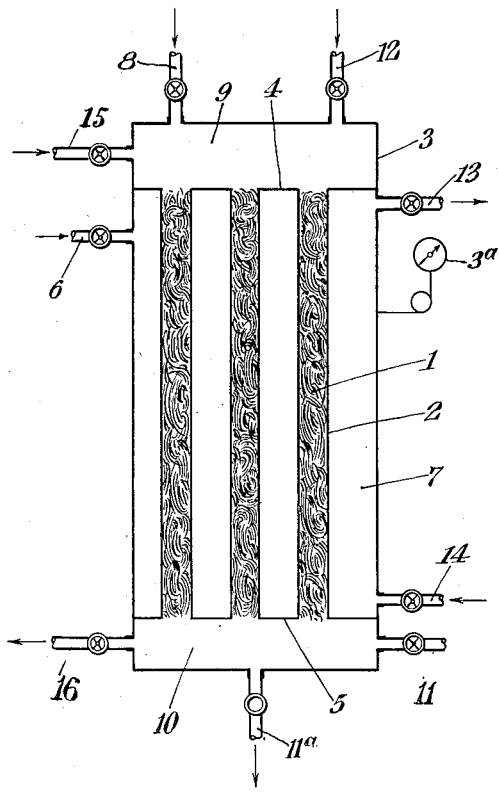

1,619,326

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

PROCESS OF REVIVIFYING CARBON USED IN PURIFYING ETHYLENE.

Application filed September 27, 1924. Serial No. 740,398.

My invention relates particularly to a process of revivifying absorbent materials which have been used in the purification of ethylene but it has relation especially, to the revivification of carbon of various kinds, and more particularly activated charcoal which has been used for the purification of ethylene.

The object of my invention is to provide a process whereby absorbent materials of various kinds which have been used in the purification of ethylene, may be revivified and made suitable for use over again. The absorbent materials treated in accordance with my process may be of various kinds but my invention relates more particularly to the treatment of carbon, and especially activated carbon, in this way.

The object of my invention is, furthermore, to bring about the revivification of the absorbent material such, for example, as activated carbon, while located in the place where it has been used in the purification of ethylene, thus avoiding handling and consequent losses of the material.

A further object is to bring about the revivification by the use of gases which will not be dangerous in the presence of inflammable materials. Another object is to avoid the use of direct heat for the same reason.

Still another object is to carry out the process economically by using low temperatures therein.

A further object is to conduct the process in a minimum period of time so as to use the materials to the best advantage therein.

Further objects of my invention will appear from the detailed description thereof contained hereinafter.

While my invention is capable of being carried out in many different ways, for the purpose of illustration I shall describe only certain ways of carrying out the same hereinafter, and while it is capable of being carried out in connection with many different types of apparatus I have shown only one type of apparatus for use in connection therewith in the accompanying drawing, in which—

The figure is a diagrammatic vertical section of an apparatus which may be used in accordance with my invention.

In carrying out my invention, as above indicated, I may revivify absorbent materials of various kinds which have been used in connection with the purification of ethylene, so as to thus enable them to be used over again. By way of illustration I shall describe in detail one way of carrying out my invention relating to the revivification of activated carbon which has been used for the purification of ethylene.

The activated carbon utilized in my process may be the kind of carbon referred to in detail in the application of Arthur A. Backhaus upon process of purifying carbon dioxide advantageously Serial No. 710,975, filed May 5, 1924; or the activated carbon may be made in any suitable way as desired. For example, however, the activated carbon may be a highly absorptive carbon or charcoal capable of absorbing substantially all the impurities in the ethylene and which may be made by any known process such as by the heat treatment or steam activation process, or a chemical treatment such as to render the carbon activated. Such activated carbon may be made from cocoanut shell carbon or carbon produced by carbonizing the shells of pits of many other kinds of nuts or by carbonizing wood, and then activating the same. An activated carbon which may be used may be, for example, the carbon obtained by coking anthracite coal in accordance with any of the known coking processes and then subjecting the coke in granulated or finely divided form to the action of steam or air at a temperature of from 700° C. to 1200° C. for a period of several hours.

The activated carbon used in the purification of ethylene will remove the impurities therefrom, such, for example, as ether, water, alcohol, other hydrocarbons, etc., and these impurities will accumulate to such an extent in the carbon that finally the effectiveness of the carbon will be greatly impaired or altogether prevented by the presence of the same.

Accordingly, in carrying out my process the activated carbon 1, while still located in the same position in which it has been used for the purification of the ethylene, that is to say in tubes 2, enclosed in a container 3, having a pressure gauge 3ª, and supported by transverse perforated plates 4 and 5, is first preferably heated up by the admission of high pressure steam having a temperature of 125° to 185° C. and a pressure of from 25 to 150 lbs. per sq. in., through a valve inlet pipe 6 leading to a space 7 which surrounds the tubes 2. By heating up the materials in this way the process of revivification is hastened. When the temperature around the tubes 2 has reached from 100° to 185° C., live steam, having a temperature of approximately 100° C., is then introduced by means of a valved pipe 8 into a space 9 located above the ends of the tubes 2 so as to cause the steam to pass through the activated carbon 1 in the tubes 2 and out of said tubes into a space 10 and thence out of the apparatus through a valved outlet pipe 11, any condensed water passing out through a drain 11ª. By passing the live steam into the activated carbon which has been heated by the surrounding high pressure steam, the live steam becomes superheated to some extent. The use of superheated steam in this way is preferable as it facilitates revivification by preventing condensation and obviating the filling of the pores with water during the treatment, so that the subsequent drying of the carbon can be readily effected. This treatment is continued until substantially all the impurities contained in the carbon have been removed therefrom, the temperature of the same ranging generally from 100° to 175° C. during the treatment and the treatment in this way usually requiring from 12 to 15 hours. The live steam inlet pipe 8 is then closed and air which may be at atmospheric temperature but preferably heated to a temperature of from 50° to 150° C., is admitted by means of a pipe 12 so as to drive the live steam out of the apparatus and out of the activated carbon. The introduction of air in this way is continued usually for from 4 to 5 hours, that is to say until the steam has been entirely displaced and the carbon has been completely dried. The pipe 6 is then closed and the high pressure steam is then allowed to escape from the apparatus through a valved pipe 13. The carbon is then allowed to cool, and if desired cold water may be admitted to the same space through a valved pipe 14, the effluent water being allowed to pass out through the pipe 13. The activated charcoal is then ready for use over again in the purification process or other purification processes as desired. In the purification process the ethylene enters by pipe 15 and passes out by pipe 16.

It will thus be seen that by conducting the process in this way danger due to direct heat is avoided and consequently the process may be used even where inflammable materials may be present in connection with or in the neighborhood of the apparatus as, for example, ethylene. Furthermore, labor and losses involved in removing the carbon for revivification to a place outside of the apparatus are avoided.

Various modifications of the process may be introduced, if desired, without departing from the spirit of my invention.

I claim:

1. The process which comprises revivifying an activated carbon used in purifying ethylene by applying live steam accompanied by indirect heat and then a hot dry gas thereto, in such a manner as to remove impurities therefrom.

2. The process which comprises revivifying an activated carbon used in purifying ethylene by applying live steam accompanied by indirect heat, then a hot dry gas thereto and then a cooling medium, in such a manner as to remove impurities therefrom.

3. The process which comprises revivifying an absorbent material used in the purification of ethylene by applying live steam and then a non-combustible gas thereto, in such a manner as to remove impurities therefrom.

4. The process which comprises revivifying an activated carbon used in the purification of ethylene by applying live steam and then a non-combustible gas thereto, in such a manner as to remove impurities therefrom.

5. The process which comprises revivifying activated carbon used in the purification of ethylene containing odorous foreign materials by the removal of the odorous foreign materials therefrom and the elimination of the odor of the same by applying live steam accompanied by indirect heat, then a hot dry gas thereto and then a cooling medium, in such a manner as to remove the said impurities therefrom and thus restore its capability of eliminating said odor from the said gas as well as restoring the activated state thereto.

In testimony that I claim the foregoing, I have hereunto set my hand this 27th day of Sept., 1924.

ARTHUR A. BACKHAUS.